United States Patent [19]
Nakamura et al.

[11] Patent Number: 5,833,347
[45] Date of Patent: Nov. 10, 1998

[54] AIMING APPARATUS FOR VEHICULAR HEADLAMP

[75] Inventors: Yasuhiro Nakamura; Mitsuhiro Matsunaga, both of Shizuoka, Japan

[73] Assignee: Koito Manufacturing Co., Ltd., Tokyo, Japan

[21] Appl. No.: 786,900

[22] Filed: Jan. 23, 1997

[30] Foreign Application Priority Data

Jan. 29, 1996 [JP] Japan ................................ 8-033156

[51] Int. Cl.⁶ .......................... B60Q 1/06; B60Q 1/068
[52] U.S. Cl. .......................... 362/66; 362/420; 362/421; 362/61
[58] Field of Search ................................ 362/66, 421, 420

[56] References Cited

U.S. PATENT DOCUMENTS

| | | | |
|---|---|---|---|
| 1,530,462 | 3/1925 | Hartwick | 362/66 |
| 4,503,486 | 3/1985 | Makita | 362/61 |
| 4,954,933 | 9/1990 | Wassen | 362/66 |
| 5,045,987 | 9/1991 | Hebert | 362/421 |
| 5,107,406 | 4/1992 | Sekido et al. | 362/61 |
| 5,331,519 | 7/1994 | Fujino | 362/66 |
| 5,337,223 | 8/1994 | Fujino | 362/66 |
| 5,414,602 | 5/1995 | Young et al. | 362/66 |
| 5,428,519 | 6/1995 | Salmon et al. | 362/421 |
| 5,541,815 | 7/1996 | Nakamura | 362/66 |
| 5,546,283 | 8/1996 | Ohtsuka et al. | 362/61 |

FOREIGN PATENT DOCUMENTS 2 618 108   1/1989   France ................................ 362/66

*Primary Examiner*—Ira S. Lazarus
*Assistant Examiner*—Ljiljana V. Ciric
*Attorney, Agent, or Firm*—Sughrue, Mion, Zinn, Macpeak & Seas, PLLC

[57] ABSTRACT

An aiming apparatus for a headlamp having a structure such that nuts-for holding adjusting screws are protected from being loaded excessively when an operation for aiming the headlamp is performed is disclosed, the apparatus having brackets fixedly provided for a automobile body, and a headlamp unit provided in such a manner that the headlamp unit can be inclined so as to change the light emission axis of the headlamp when the headlamp unit is inclined, wherein the brackets and the headlamp unit are connected to each other by a rotation support portion and two adjusting screws screwed to nuts provided for brackets, a plane of the headlamp unit on which connection points between the members are located is inclined with respect to the optical axis, the adjusting screws are disposed substantially perpendicular to the plane, and each of the nuts has a cylindrical inner surface.

5 Claims, 11 Drawing Sheets

AIMING APPARATUS FOR VEHICULAR HEADLAMP

BACKGROUND OF THE INVENTION

1. Field of the Invention

The present invention relates to an aiming apparatus for a vehicular headlamp, and more particularly to an aiming apparatus for a headlamp having adjusting screws and capable of protecting nuts for holding the adjusting screws from being loaded excessively when the aiming operation is performed.

2. Related Art

An aiming apparatus for a headlamp has been known which includes stationary members fixedly provided for an automobile body and a tiltable member provided for the stationary members in such a manner that the tiltable member can tilt so as to change the light axis emitting from the headlamp, wherein the stationary members and the tiltable member are connected to each other by a rotation support portion and two adjusting screws screwed to nuts supported by the stationary members.

The conventional aiming apparatus for a headlamp has a structure such that the adjusting screws are disposed substantially in parallel to the optical axis of the headlamp.

The conventional aiming apparatus for a headlamp is generally thought to be acceptable when the connection points between the tiltable member and the rotation support portion and the two adjusting screws are located in a plane which is perpendicular to the optical axis. However, if the plane is inclined with respect to the optical axis, the nuts to which the adjusting screws are screwed must bear an excessively heavy load when the aiming operation is performed.

Since the plane is inclined with respect to the optical axis, the amount of movement of the connection point between the tiltable member and the adjusting screws within a plane perpendicular to the optical axis is enlarged excessively. Therefore, the adjusting screws are considerably inclined with respect to the axes of the nuts. Thus, the nuts must bear an excessively heavy load.

SUMMARY OF THE INVENTION

The present invention was made in view of the problems accompanying the conventional aiming apparatus discussed above. Accordingly, an object of the present invention is to reduce the shift of the connection point between adjusting screws and a tiltable member with respect to the axes of the adjusting screws.

The above and other objects can be achieved by a provision of an aiming apparatus for a headlamp in which, according to one aspect of the present invention, the light emission axis of the headlamp is changed with respect to the automobile body, and the aiming apparatus for a headlamp comprises stationary members fixedly provided for the automobile body and a tiltable member provided for the stationary members in such a manner that the tiltable member can tilt so as to change the light emission axis of the headlamp when the tiltable member tilts, wherein the stationary members and the tiltable member are connected to each other by a rotation support portion and two adjusting screws screwed to nuts provided for the stationary members, a plane of the tiltable member on which connection points between the members are located is inclined with respect to the optical axis, the adjusting screws are disposed substantially perpendicular to the plane, and each of the nuts has a cylindrical inner surface.

Since the aiming apparatus for a headlamp according to the present invention has the structure such that the two adjusting screws are disposed substantially perpendicular to the plane on which the adjusting screws, the rotation support portion and the tiltable member are located, the shift of the connection point between the adjusting screws and the tiltable member with respect to the axes of the adjusting screws can be reduced. Therefore, the load, which must be borne by the nuts to which the adjusting screws are screwed, can be effectively reduced.

Other objects, features and advantages of the invention will be evident from the following detailed description of the preferred embodiments described in conjunction with the attached drawings.

DESCRIPTION OF THE PREFERRED EMBODIMENTS

Figure 1:
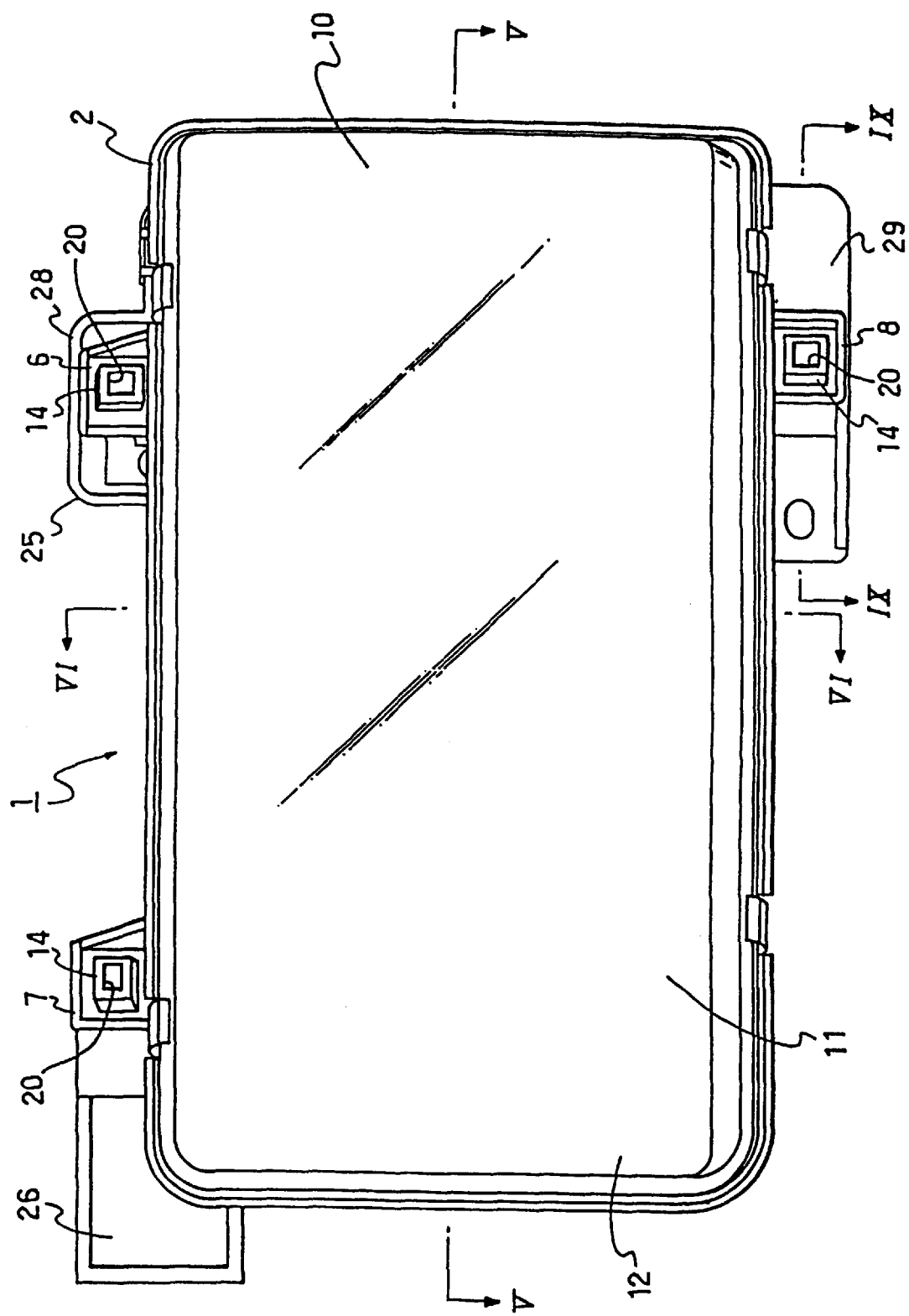
FIG. 1 is a front view showing an aiming apparatus for a headlamp according to one embodiment of the present invention.

An embodiment of an aiming apparatus for a headlamp according to the present invention will now be described with reference to accompanying drawings. The embodiment is structured such that the present invention is applied to a so-called unit movable type headlamp apparatus, that is, a headlamp unit having a reflector, a lens for covering the front opening of the reflector and a light source bulb disposed in a lamp space formed by the reflector and the lens and formed into a member which can be inclined with respect to the automobile body.

A headlamp unit 1 is provided with a reflector 2 made of synthetic resin and provided with a concave part 3 opening forwards. The concave part 3 has surfaces 4, substantially all of which are formed into paraboloids of revolution so that the surface formed into the paraboloids of revolution serves as reflective surfaces. The edge of opening of the reflector 2 has an attaching groove 5 opening forwards. An upper portion of the edge of the opening has support members 6 and 7 integrally formed at positions adjacent to the right-hand end and the left-hand end to project upwards. Moreover, a support member 8 is integrally formed to project downward from a position adjacent to the right-hand end as viewed in FIG. 1. The support members 6, 7 and 8 respectively have rectangular support holes 9.

An outer lens 10 is made of a transparent material such as, for example, glass or synthetic resin. The outer lens 10 has a front portion 11 for covering the front portion of the concave part 3 of the reflector 2 and a side portion 12 projecting substantially rearwards from the periphery of the front portion 11, the front portion 11 and side portion 12 being integrally formed. The rear end of the side portion 12 is located so as to be received by an attaching groove 5 formed in the reflector 2 and secured by an adhesive agent.

As shown in the figures, a light source bulb 13 is held by the rear portion of the reflector 2. Each of receptors 14 is made of elastic synthetic resin such as, for example, NYLON 66 (a condensation product of adipic acid and hexamethylenediamine, Hawley's Condensed Chemical Dictionary 844 (12th ed. 1993)). The receptor 14 has a main portion 15 having a substantially rectangular shape when viewed in a longitudinal direction, receiving members 16 projecting outwards over the rear ends of the side surfaces in the lengthwise direction of the main portion 15 and a projection 17 formed into an annular shape projecting over the rear surface of the main portion 15.

A receiving recess 18 having a spherical shape is formed in the substantially central portion of the receptor 14 in the axial direction. The receiving recess 18 has a communicated hole 19 opened at the rear end of the projection 17 so that the receiving recess 18 is opened at the rear end. The communicated hole 19 has a circular lateral cross sectional shape and tapers such that a rear end 19a of the communicated hole 19 is gradually enlarged in the rearward direction. Another portion 19b of the communicated hole 19 is formed into a moderate tapered shape which is gradually enlarged in the rearward direction. The inner diameter of the portion 19b is somewhat smaller than the inner diameter of the receiving recess 18.

In a portion in front of the receiving recess 18 of the receptors 14, there is formed a confronting hole 20 opening at the front end and having a rectangular lateral cross sectional shape.

U-shaped slits 21 that open forward are provided through the side walls of the main portion 15. Portions 22 surrounded by the slits 21 are formed into engaging members. Engaging projections 23 are formed to project from the rear end surfaces of the engaging members 22. The front surfaces of the engaging projections 23 are formed into inclined surfaces 23a inclined rearwards in the outward direction, while the rear surfaces of the engaging projections 23 are formed into engaging surfaces 23b perpendicular to the axial direction.

Moreover, slits 24 are provided through the side surfaces of the main portion 15 in the axial direction of the main portion 15, each of the slits 24 extending from a position near the front end of the main portion 15 to the rear end of the projection 17.

The receptors 14 structured as described above are supported by the support members 6, 7 and 8 of the reflector 2. That is, the front end of the receptor 14 is inserted into the rear end of the support hole 9. As a result, the inclined surfaces 23a of the engaging projections 23 are pressed by the edge of the support hole 9 so that the engaging members 22 are deflected inwards. Thus, the main portion 15 of the receptor 14 is inserted into the support hole 9 until the receiving member 16 is brought into contact with the rear surface of the support member 6 (or 7 or 8). When the receiving member 16 is brought into contact with the rear surface of the support member 6 (or 7 or 8), the engaging projections 23 are positioned in front of the support hole 9. Thus, the engaging members 22 are restored to the original state attributable to the elasticity thereof. As a result, the engaging surfaces 23b of the engaging projections 23 abut the front surface of the support member 6 (or 7 or 8) so that the receptor 14 is supported by the support member 6 (or 7 or 8).

Brackets 25 and 26 are secured to an automobile body 27 and made of synthetic resin. As shown in FIG. 1, the bracket 25 is disposed on the right-hand side, while the bracket 26 is disposed on the left-hand side.

Figure 7:
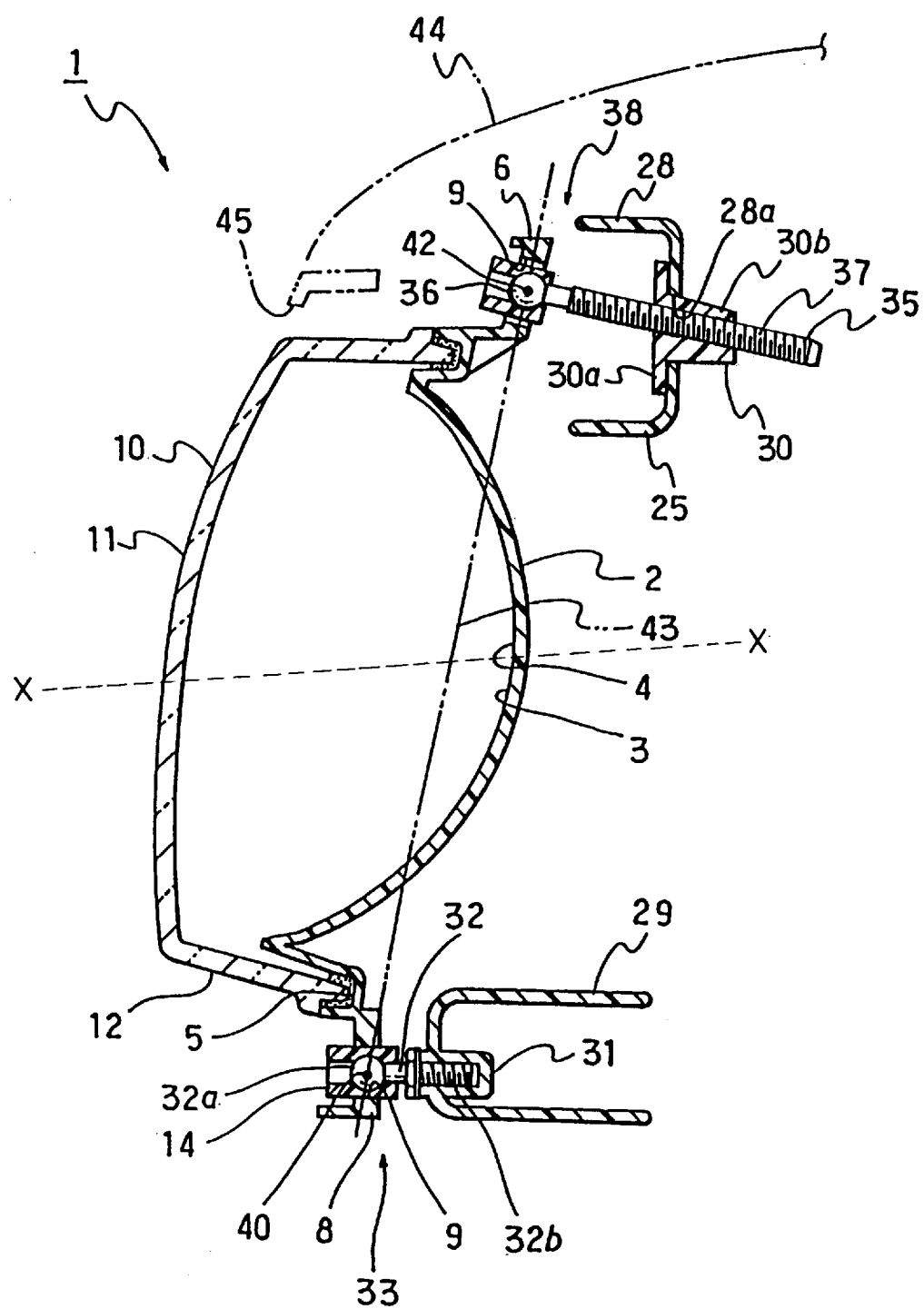
FIG. 7 is a cross sectional view taken along line VII—VII shown in FIG. 2.

Referring to FIG. 7, holding portions 28 and 29 respectively are formed on the two vertical ends of the right-hand bracket 25. A nut 30 is supported by the upper holding portion 28. The nut 30 is formed by integrating a plate-like attaching portion 30a and a nut portion 30b that extends rearwardly from the attaching portion 30a, the attaching portion 30a and the nut portion 30b being made of synthetic resin. The nut portion 30b has a cylindrical shape extending in the axial direction. The nut portion 30b of the nut 30 is, inserted through an attaching hole 28a provided in the holding portion 28, while the attaching portion 30a is secured to the holding portion 28.

A boss portion 31 projecting rearwards is integrally formed with the lower holding portion 29 in the lower portion of the bracket 25. A support point shaft 32 has a ball member 32a at the leading end thereof. A thread shaft portion 32b is formed in the rear portion of the support shaft 32. The thread shaft portion 32b of the support shaft 32 is, from the front portion thereof, screwed to the boss portion 31. Thus, the support shaft 32 is held by the holding portion 29 of the bracket 25.

The ball member 32a of the support shaft 32 is rotatively engaged to the receiving recess 18 of the receptors 14 supported by the lower support member 8 of the reflector 2 of the headlamp unit 1 so that a rotation support portion 33 is formed.

Figure 8:
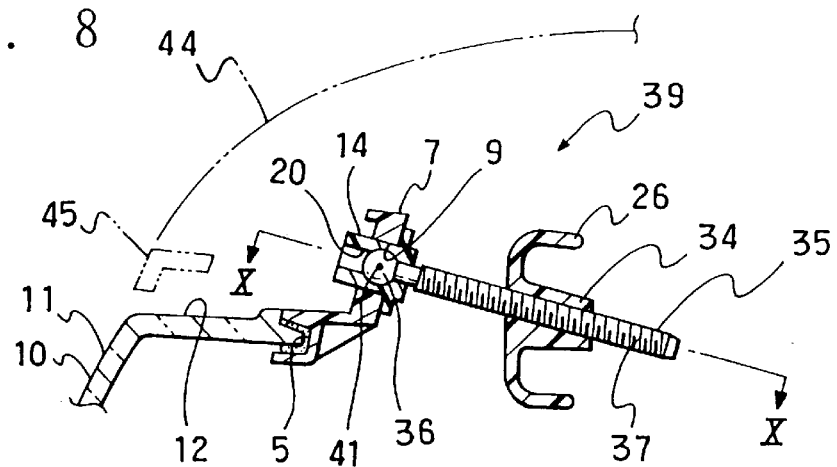
FIG. 8 is a cross sectional view taken along line VIII—VIII shown in FIG. 2.
Figure 9:
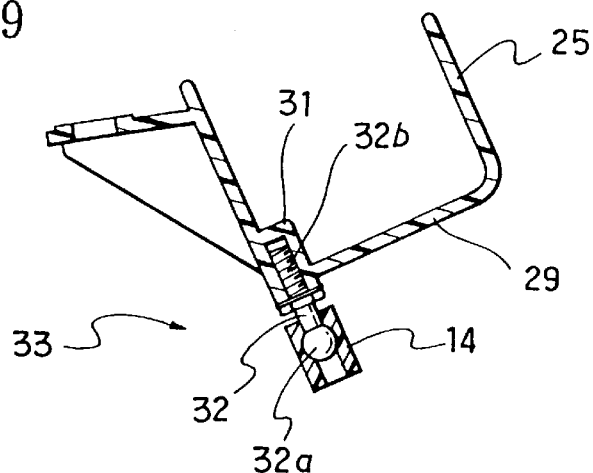
FIG. 9 is a cross sectional view taken along line IX—IX shown in FIG. 1.
Figure 10:
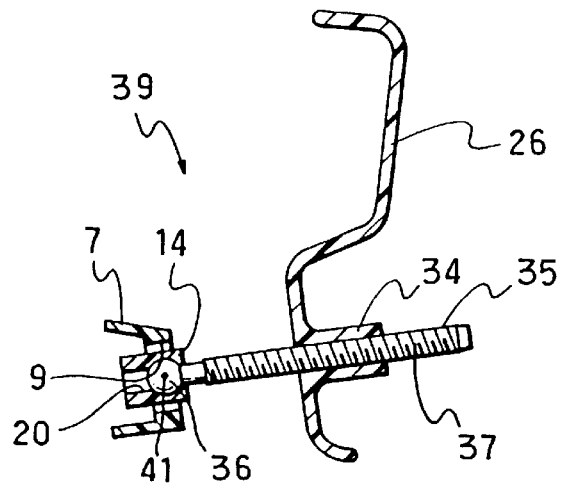
FIG. 10 is a cross sectional view taken along line X—X shown in FIG. 8.
Figure 11:
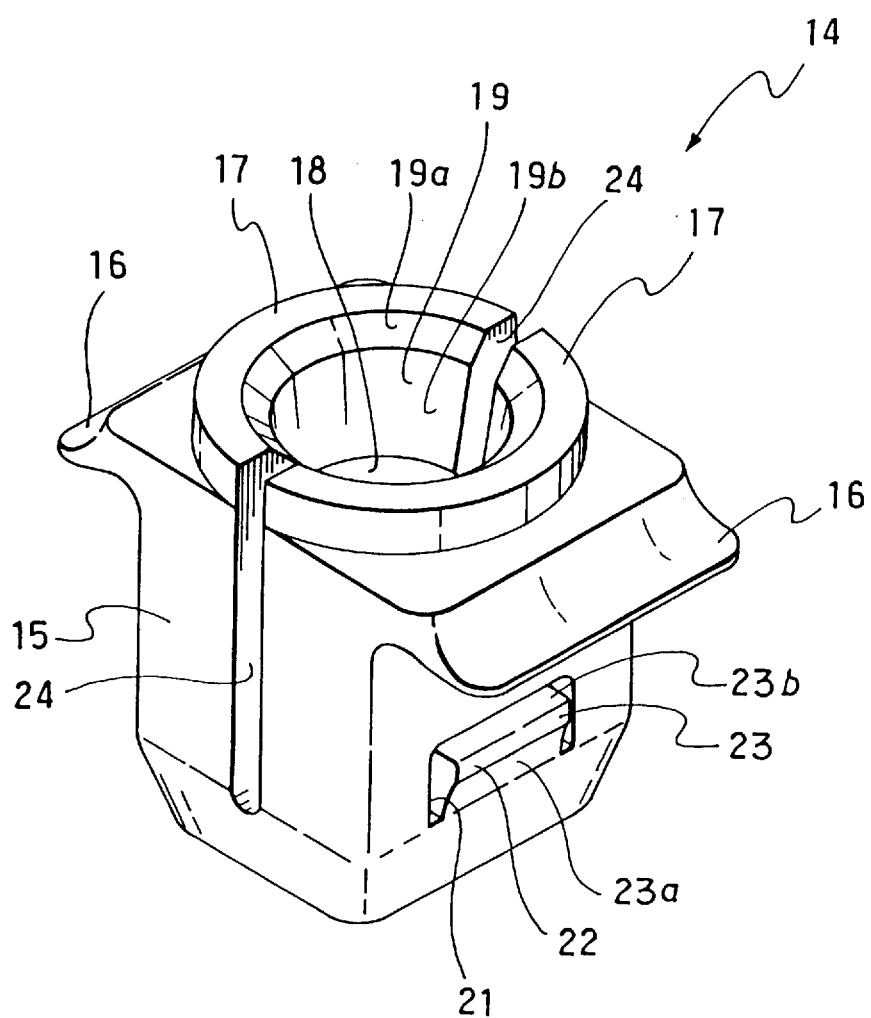
FIG. 11 is an enlarged perspective view showing a receptor.

With reference to FIGS. 8 and 10, a nut 34 projecting substantially rearwards is integrally formed with the upper left bracket 26, the nut 34 being formed into a substantially cylindrical shape.

Figure 2:
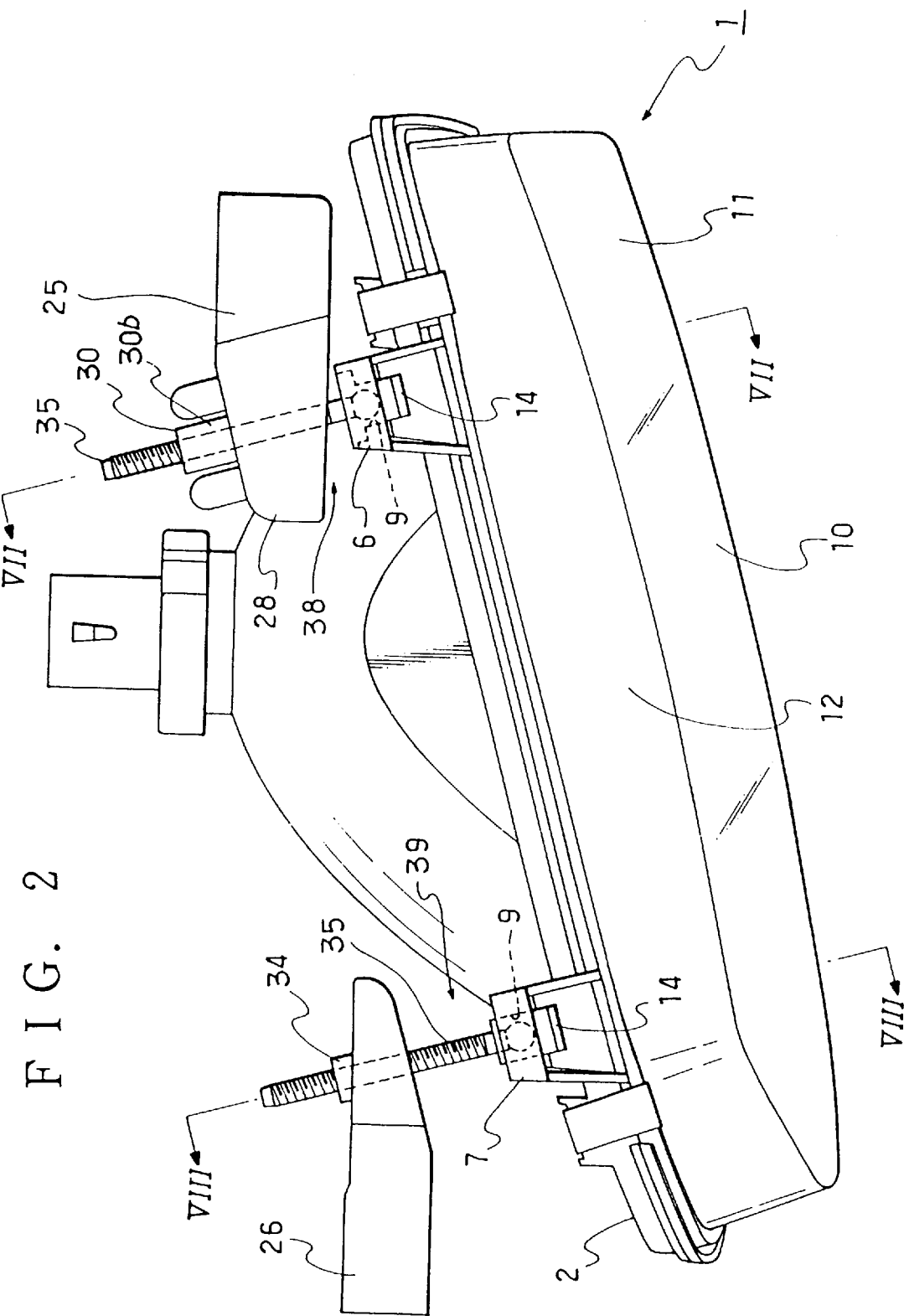
FIG. 2 is a plan view of the aiming apparatus shown in FIG. 1.
Figure 3:
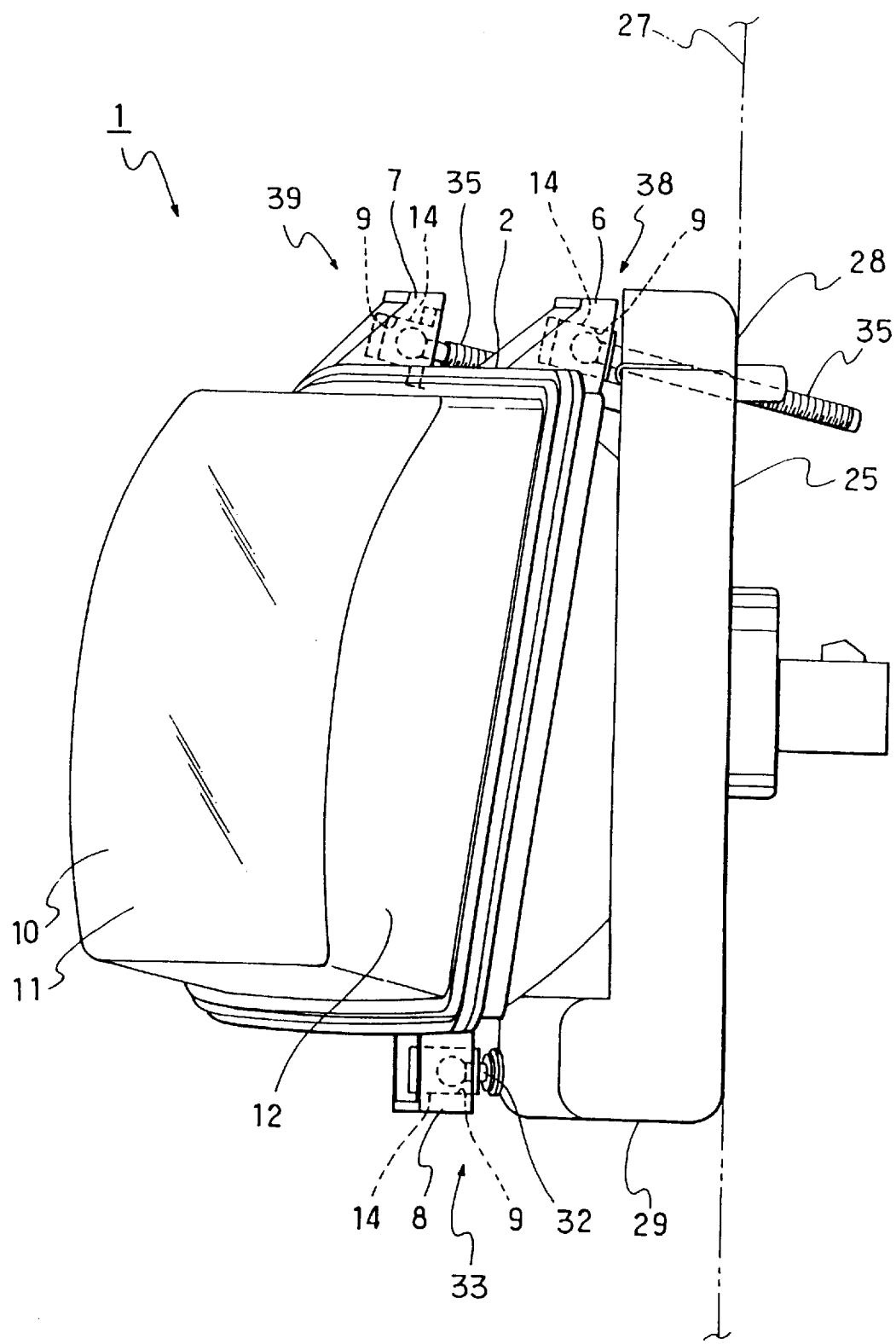
FIG. 3 is a side view of the aiming apparatus shown in FIG. 1.
Figure 4:
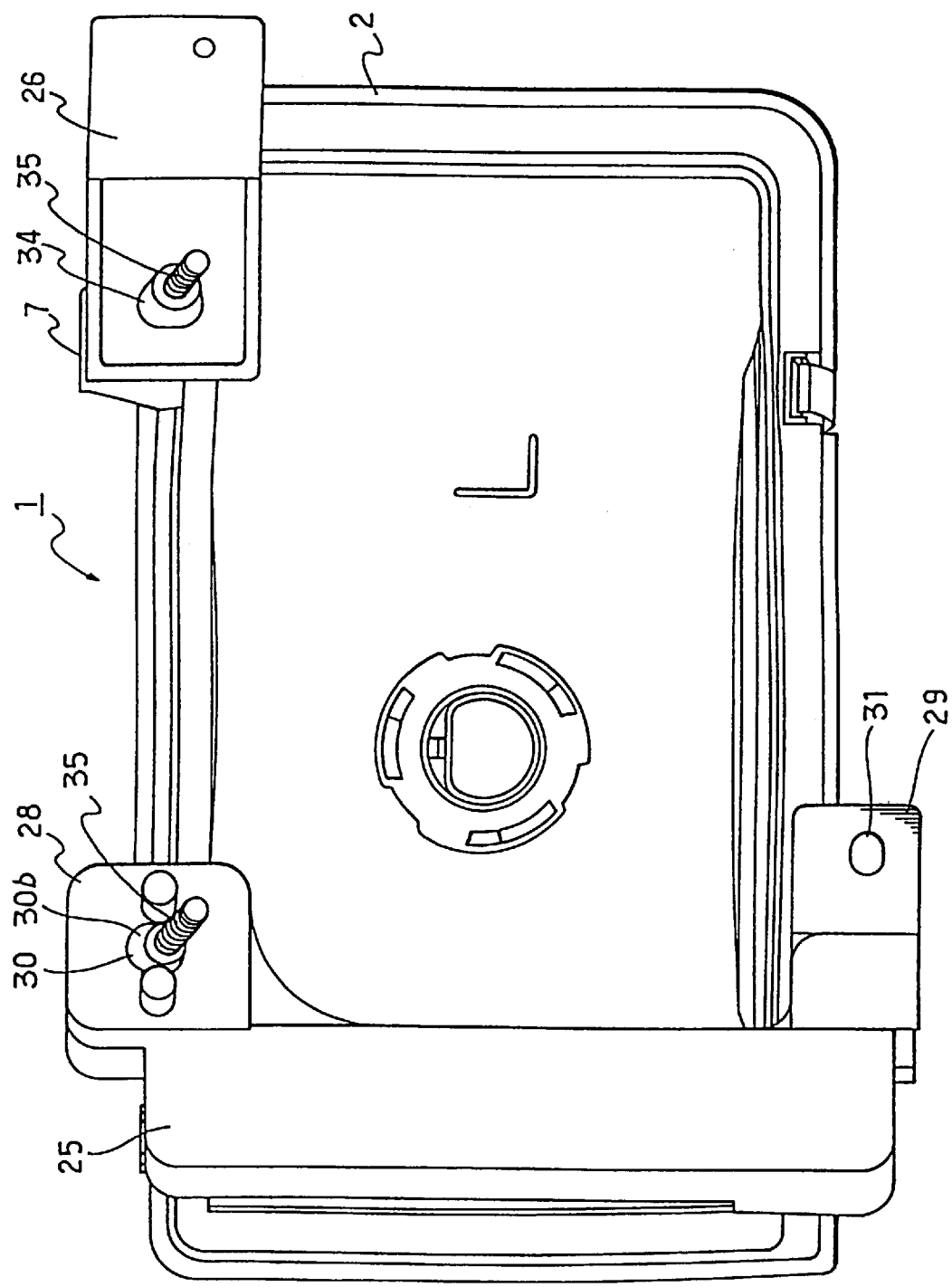
FIG. 4 is a rear view of the aiming apparatus shown in FIG. 1.
Figure 5:
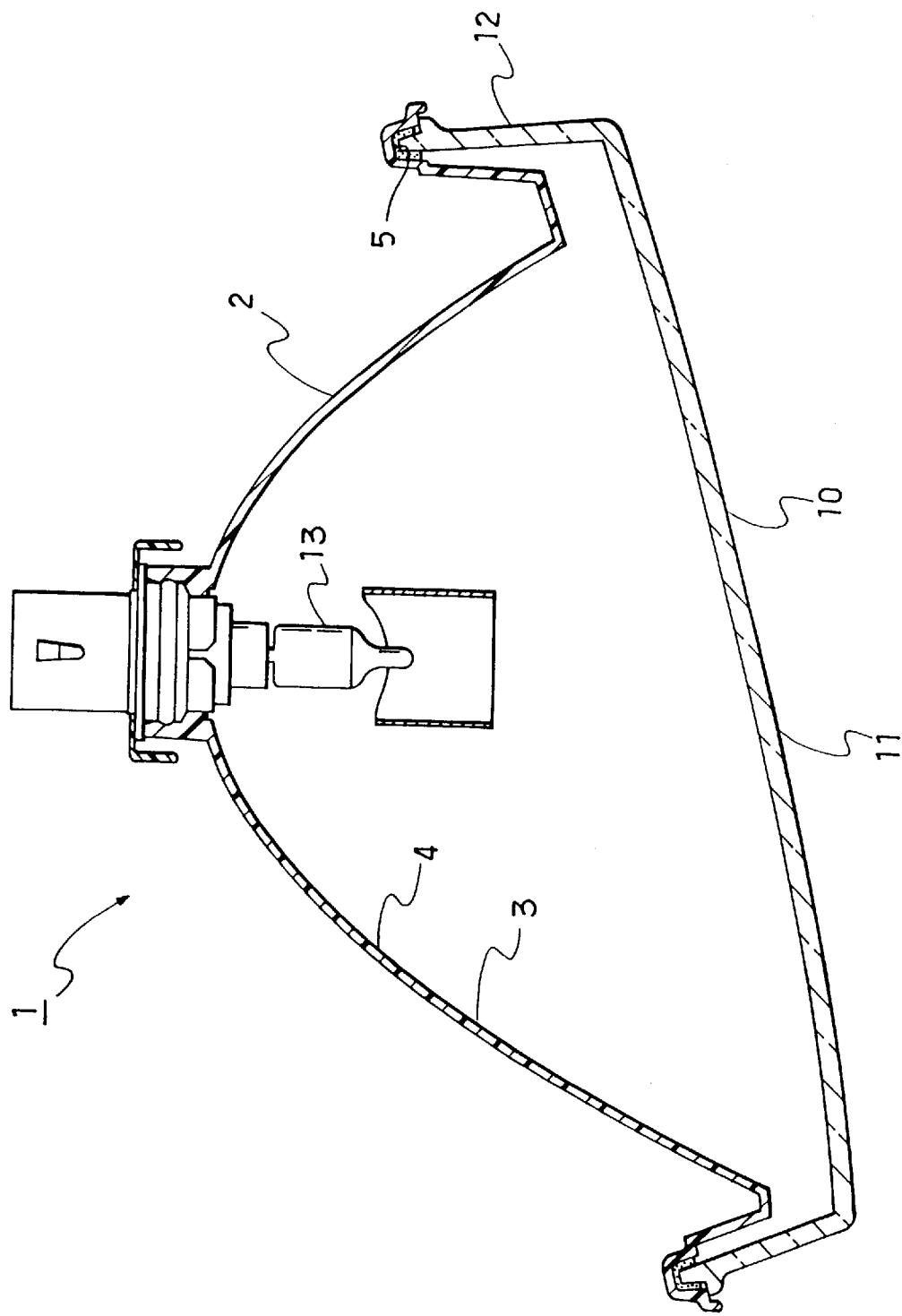
FIG. 5 is a cross sectional view taken along line V—V shown in FIG. 1.
Figure 6:
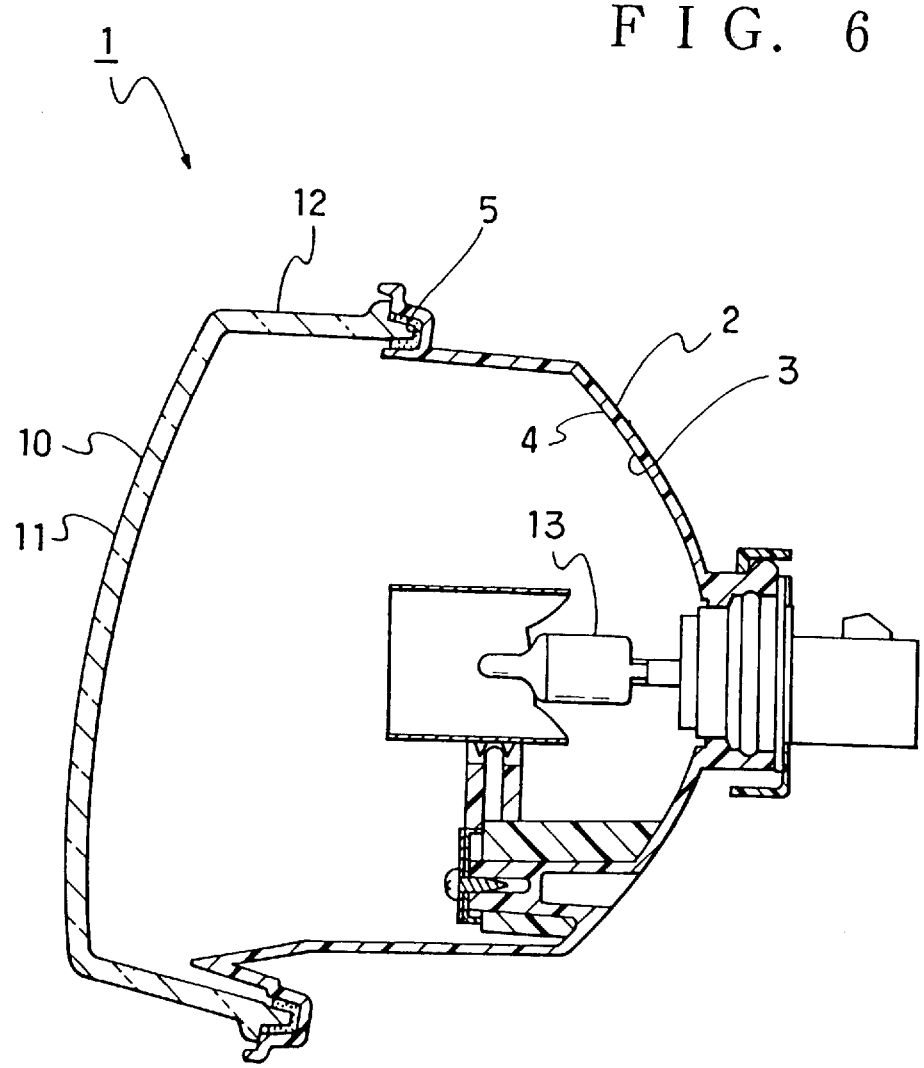
FIG. 6 is a cross sectional view taken along line VI—VI shown in FIG. 1.
Figure 14:
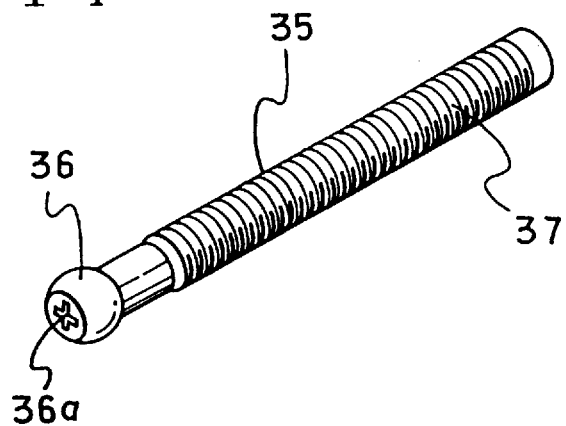
FIG. 14 is an enlarged perspective view showing an adjusting screw.

Turning to FIG. 14, an adjusting screw 35 has a ball member 36 at the leading end thereof. The entire adjusting screw, except for the leading end thereof comprises a thread shaft portion 37. Cross engaging grooves 36a are formed in the front end surfaces of the ball members 36. The thread shaft portions 37 of the adjusting screws 35 are screwed to the nuts 30 and 34. The ball members 36 are rotatively received by the receiving recesses 18 of the receptors 14 supported by the support members 6 and 7 of the headlamp unit 1. As a result, aiming adjustment portion 38 and 39 for changing the distance from the headlamp unit 1 and the automobile body 27 are formed (FIGS. 2 and 3).

Figure 12:
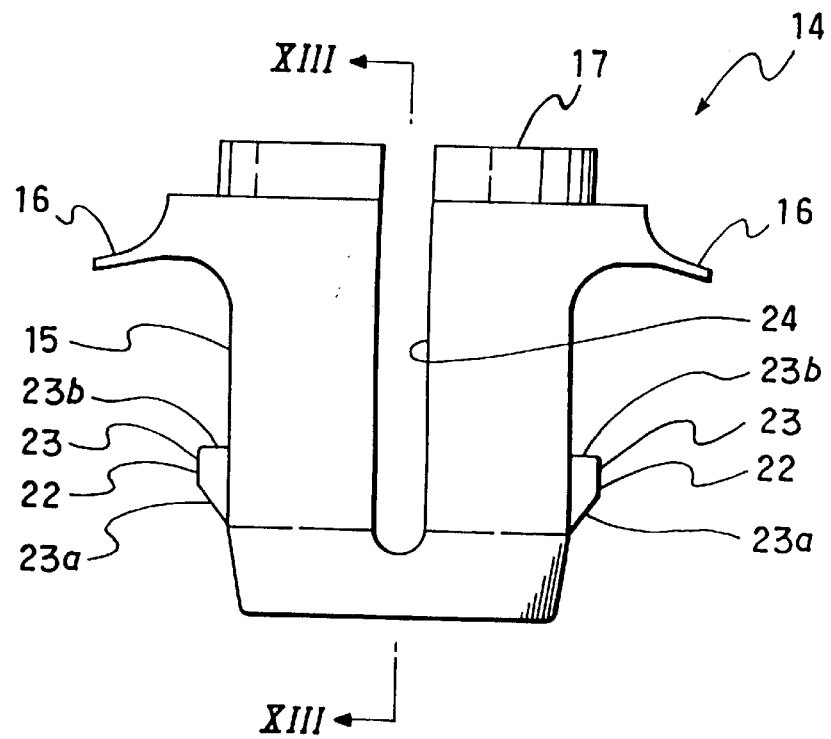
FIG. 12 is an enlarged side view showing the receptor.
Figure 13:
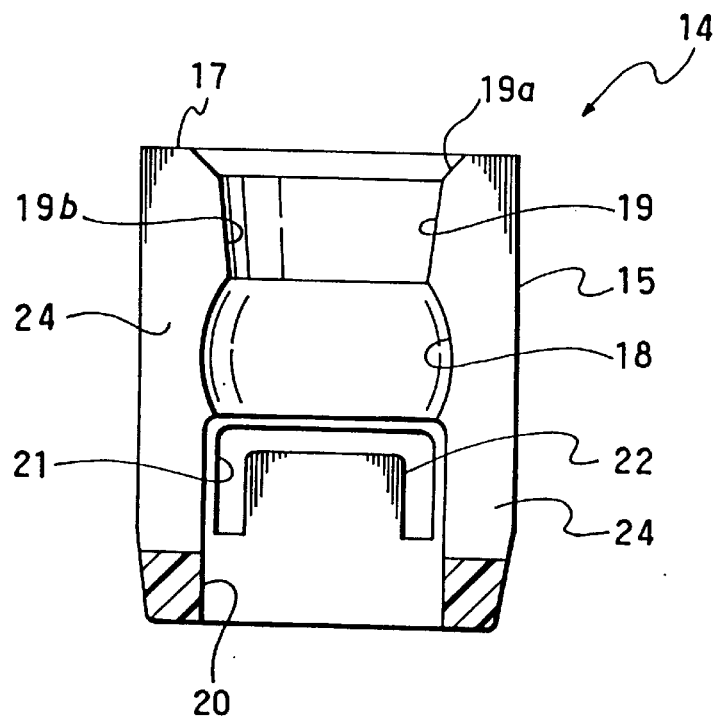
FIG. 13 is a cross sectional view taken along line XIII—XIII shown in FIG. 12.

With reference to FIGS. 12–14, the ball members 36 are received by the receiving recesses 18 of the receptors 14 before the receptors 14 are attached to the support holes 9. As the ball member 36 is inserted into the rear end of the communicated hole 19, the slits 24 allow the rear portion of of the receptor 14 to expand. Thus, the ball members 36 can easily be received by the receiving recesses 18..

As described above, the ball members 36 are received by the receiving recesses 18, and then the receptors 14 are inserted into the support holes 9. When the receptors 14 are inserted into the support holes 9, the peripheries of the receptors 14 are restricted by the edges of the openings of the support holes 9. Therefore, notwithstanding the slits 24, the rear portions of the receptors 14 are fixed to prevent separation of the ball members 36. Also the engagement of the ball member 32a of the support shaft 32 to the receiving recesses 18 is similarly performed.

When the adjusting screw 35 in the upper right aiming adjustment portion 38 is rotated, the headlamp unit 1 rotates about an axis defined by a connection point 40 in the rotation support portion 33 between the headlamp unit 1 and a support point shaft 32, and a connection point 41 in the upper left aiming adjustment portion 39 between the headlamp unit 1 and the adjusting screws 35. When the adjusting screw 35 in the upper left aiming adjustment portion 39 is rotated, the headlamp unit 1 is rotated about an axis defined by a connection point 40 in the rotation support portion 33 between the headlamp unit 1 and the support shaft 32, and a connection point 42 in the upper right aiming adjustment portion 38 between the headlamp unit 1 and the adjusting screw 35. Note that the adjusting screw 35 is rotated by rotating the engaging groove 36 which is exposed through the confronting hole 20 of the receptor 14 with, for example, a Phillips head screwdriver, which is the operation member according to the present invention such that the leading end of the operation member is engaged to the engaging groove 36.

Figure 15:
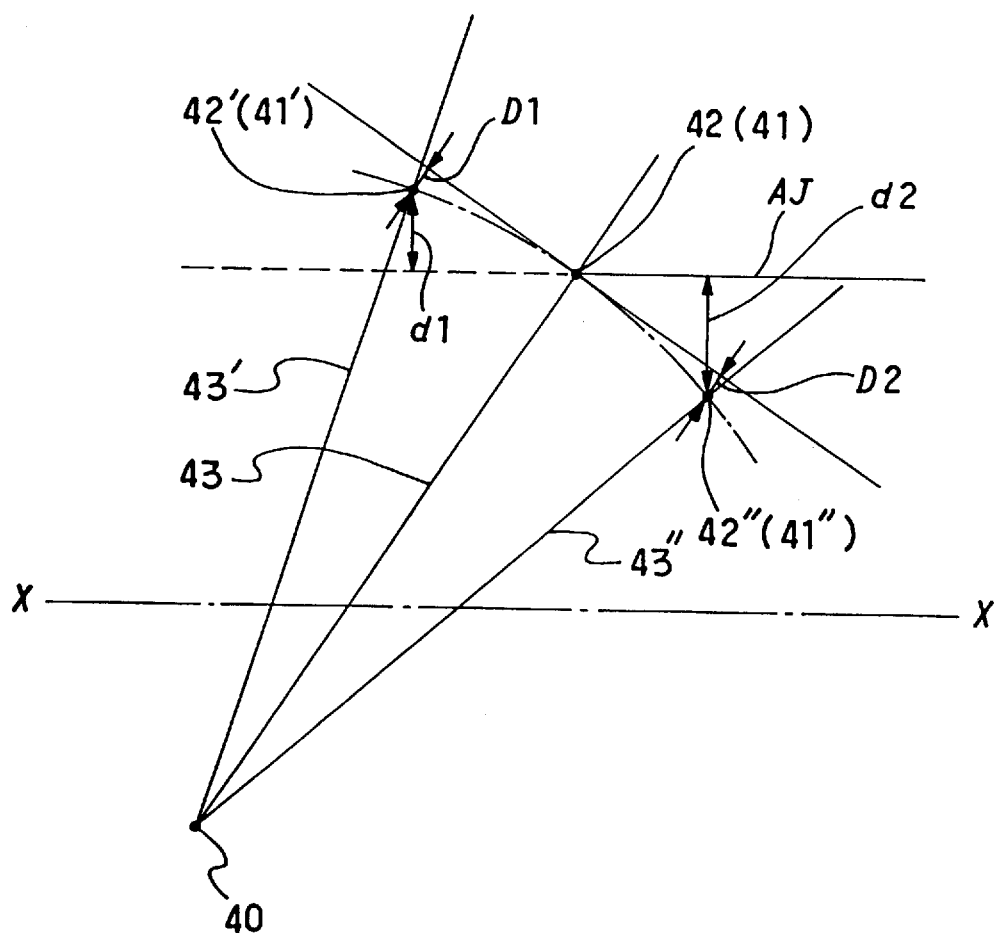
FIG. 15 is an explanatory view of the operation of the present invention.

Referring to FIG. 15, a plane 43 defined by the three connection points 40, 41 and 42 is inclined with respect to an optical axis X—X of the headlamp unit 1. Therefore, the present invention has a structure in which the adjusting screws 35 are perpendicular to the plane 43 by inclining the axis line of each of the nuts 30 and 34 relative to the optical axis X—X. As a result, the amount of shift of the connection point 41 (or 42) between the adjusting screw 35 and the headlamp unit 1 with respect to the axis of the adjusting screw 35 can be reduced when the headlamp unit 1 has been inclined. Thus, load, which must be borne by the nut 34 (or 30) receiving the adjusting screws 35, can be reduced.

As shown in FIG. 15, the displacement of a connection point 42' (or 41') from the axial line of an adjusting screw AJ when the headlamp unit 1 has been rotated forwards is d1 assuming that the axis of the adjusting screw AJ is in parallel to the optical axis X-X of the headlamp unit 1. The displacement of a connection point 42" from the axis of the adjusting screw AJ when the headlamp unit 1 has been rotated rearwards is d2. In this case, the displacements d1 and d2 are considerably large quantity. On the other hand, according to the present invention in which the axis of the adjusting screws 35 are perpendicular to the plane 43, the associated displacement of the connection point 42' (or 41') from the axis of the adjusting screw 35 when the headlamp unit 1 has been rotated forwards is reduced to D1. Moreover, the associated displacement of the connection point 42" (or 41") from the axis of the adjusting screw 35 when the headlamp unit 1 has been rotated rearwards is reduced to D2. The displacements D1 and D2 are significantly smaller that the displacements d1 and d2. Therefore, the load which must be borne by the nut 30 (or 34) to which the adjusting screw 35 is screwed can considerably be reduced.

Since the adjusting screws 35 are inclined downwards in the rearward direction, the adjusting screws 35 can be operated from a position above a rim 45 after opening a bonnet 44 (FIGS. 7 and 8). Therefore, aiming can easily be performed.

As described above, the aiming apparatus for a headlamp in which the light emission axis of the headlamp is changed with respect to the automobile body, comprises: stationary members fixed to the automobile body; and the tiltable member provided for the stationary members in such a manner that the tiltable member can tilt so as to change the light emission axis of the headlamp when the tiltable member is inclined, wherein the stationary members and the tiltable member are connected to each other by the rotation support portion and two adjusting screws screwed to nuts provided for the stationary members, the plane of the tiltable member on which connection points between the members are located is inclined with respect to the optical axis, the adjusting screws are disposed substantially perpendicular to the plane, and each of the nuts has the cylindrical inner surface.

Since the aiming apparatus for a headlamp according to the present invention has the structure such that the two adjusting screws are disposed substantially perpendicular to the plane on which the adjusting screws, the rotation support portion and the tiltable member are located, the shift of the connection point between the adjusting screws and the tiltable member with respect to the axes of the adjusting screws can be reduced. Therefore, the apparatus of the invention can reduce the load, which must be borne by the nuts to which the adjusting screws are screwed.

Although the above-mentioned embodiment has the structure such that the present invention is applied to a so-called unit movable type headlamp apparatus, the present invention may be applied to a so-called reflector movable type, that is, a headlamp having a structure such that a lens is attached to a lamp body having a forward recess to cover the recess, a reflector supporting a light source is supported in a lamp chamber formed by the lamp body and the lens in such a manner that the reflector can be inclined, and the reflector serves as the tiltable member.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. An aiming apparatus for a headlamp in which an optical axis of said headlamp is adjustable with respect to a vehicle body, the aiming apparatus comprising:

a stationary member secured to the vehicle body, said stationary member having two nuts;

two adjusting screws for adjusting the optical axis of said headlamp, each of said two adjusting screws having a leading end and a second end screwed to one of said two nuts;

a rotation support member having a leading end and a second end secured to said stationary member; and a tiltable member tiltably coupled to said stationary member by connection points between said tiltable member and said leading ends of said two adjusting screws and said leading end of said rotation support member;

wherein said connection points define a plane which is fixed at an incline with respect to the optical axis of said headlamp, and said plane is substantially perpendicular to said two adjusting screws.

2. An aiming apparatus for a headlamp according to claim 1, wherein said tiltable member is a reflector of a headlamp and said two adjusting screws connect to an upper surface of said reflector, and said two adjusting screws are inclined downward in a rearward direction with respect to the optical axis of the headlamp.

3. An aiming apparatus for a headlamp according to claim 1, wherein said connection points further comprise:

a ball member formed at each of said leading ends of said two adjusting screws and said leading end of said rotation support member;

a receptor associated with each ball member, each receptor supported by said tiltable member and provided with a confronting hole that communicates with a recess, said recess rotatable receiving said ball member; and an engaging portion formed at an end of said ball member, said engaging portion exposed through said confronting hole provided in said receptor.

4. An aiming apparatus for a headlamp according to claim 3, wherein each receptor is fabricated from an elastic material.

5. An aiming apparatus for a headlamp according to claim 4, wherein each receptor further comprises a longitudinal slot provided through a side wall of said receptor, such that said longitudinal slot extends from one end of said receptor to a location proximate to said confronting hole.

* * * * *